H. B. HEBERT.
Grain Drier.
No. 98,374.                                   Patented Dec. 28, 1869.
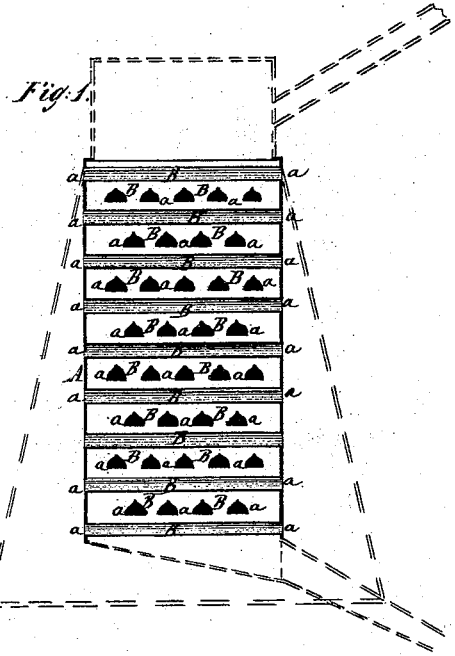
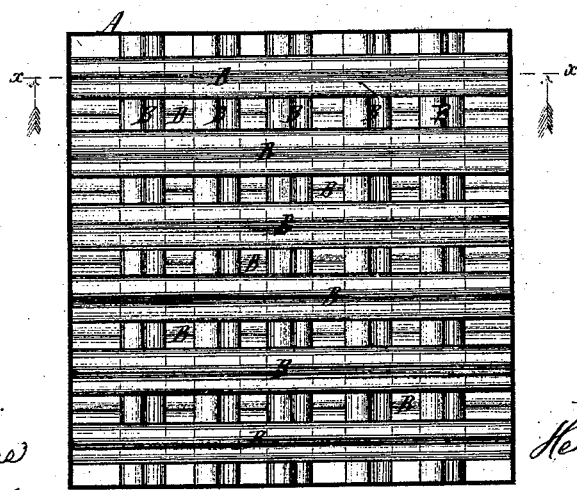
Witnesses.                                    Inventor.
C. Wahlers                                    Henry B. Hebert
E. F. Kastenhuber                             per
                                              Van Santvoord & Hauff
                                              Attys

United States Patent Office.

HENRY B. HEBERT, OF NEW YORK, N. Y.

Letters Patent No. 98,374, dated December 28, 1869.

GRAIN-DRIER.

The Schedule referred to in these Letters Patent and making part of the same.

*To all whom it may concern:*

Be it known that I, HENRY B. HEBERT, of the city, county, and State of New York, have invented a new and improved Grain-Drier; and I do hereby declare the following to be a full, clear, and exact description thereof, which will enable those skilled in the art to make and use the same, reference being had to the accompanying drawing, forming part of this specification, in which drawing—

Figure 1 represents a vertical section of this invention.

Figure 2 is a horizontal section of the same.

Similar letters indicate corresponding parts.

This invention relates to a grain-drier, in which the grain is passed down through a chute or tower, provided with a series of scattering-bars or grates, placed one above the other, the bars of one grate running transversely to those of the grate above and below it, in such a manner that the grain, on striking these bars, is scattered, and each single grain is turned over and over, and exposed from all sides to the current of air passing up through the chute or tower. The air has free access to the interior of the chute or tower, through air-holes in the sides of the same, said air-holes being arranged in a zigzag position, or in the form of a quincunx, and being situated, one under each of the scattering-bars, in such a manner, that while the free access of the air to the interior of the chute or tower is not obstructed, the scattering-bars prevent the grain from escaping through said air-holes.

In the drawing—

The letter A designates a chute or tower, built up of sheet-metal, or any other suitable material, to the required height, and so arranged that it can be exposed to a current of hot air, created by a furnace of any desirable construction, this object being effected by surrounding said chute with a jacket, which is situated over a hot-air furnace, or by any other means which will produce the desired effect.

In the interior of the chute A, is secured a series of scattering-bars or grates, B, which are placed, by preference, in a horizontal position, and so arranged that the bars of each grate run in a transverse direction to those above and below, as shown in the drawing.

The grain or other material to be dried, is conducted into the chute A from above, and on striking the bars B, said material is scattered, each single grain being compelled to find its way through between the grates; and as the grains jump from one bar to the other, they are turned over and over, and thus exposed uniformly, from all sides, to the current of hot air passing up through the chute.

The bars B are, by preference, so formed that they present a sharp edge on the top, so that the grain or other material to be dried is prevented from lodging thereon; but I do not wish to confine myself to the precise shape of the bars as shown in the drawing.

The hot air has free access to the interior of the chute A, through air-holes $a$ in the sides thereof, said air-holes being arranged in a zigzag position, one under each of the scattering-bars B, so that said bars prevent the grain, or other material to be dried, from escaping through said air-holes, while the passages for the air are left unobstructed.

By these means, the grain, or other material, passing down through the chute, is thoroughly and uniformly dried, the moisture being free to escape through the open top of the chute, while the dried grain, or other material, passes off at the bottom of the chute, through a suitable spout.

It will be noticed, that the principal difference between my grain-drier and those heretofore used, is in the method of passing the grain through the chute, the grain being scattered, in my drier, so that each single grain is exposed from all sides to the current of heated air, while in the driers heretofore used, the grain passes down through the chute in a stream of more or less depth, whereby the action of the heated air is rendered unequal, and the operation of drying is rendered uncertain and unsatisfactory.

In my drier, the scattering-bars of alternate grates, or series of bars, that is to say, those which are parallel with each other, are arranged opposite the interspaces of the other alternate parallel bars, both above and below the same, so that the grain is deflected from the interspaces of the respective parallel rows or series throughout the drier.

The chute A may also be made in the form of a cylinder, with or without a central air-flue, and in this case, the scattering-bars would be made to radiate from the centre.

What I claim as new, and desire to secure by Letters Patent, is—

The arrangement, in transverse series, of the scattering-bars B with those of one series alternating with each other, in connection with the air-holes $a\ a$, arranged zigzag, and relatively to the said transverse and alternate bars, the whole together as described.

HENRY B. HEBERT.

Witnesses:
W. HAUFF,
C. WAHLERS.